United States Patent [19]

Kearns

[11] 4,194,286
[45] Mar. 25, 1980

[54] JOHNNY BOLT CUTTER

[76] Inventor: Paul Kearns, 12009 Judson Rd., Wheaton, Md. 20902

[21] Appl. No.: 830,137

[22] Filed: Sep. 2, 1977

[51] Int. Cl.² .............................................. B26B 25/00
[52] U.S. Cl. ........................................ 30/226; 30/240; 225/102
[58] Field of Search ................ 30/226, 227, 252, 254, 30/173, 196, 197, 240; 225/102, 1

[56] References Cited

U.S. PATENT DOCUMENTS

| | | | |
|---|---|---|---|
| 913,013 | 2/1909 | Jensen | 225/102 |
| 2,543,018 | 2/1951 | Hainline | 30/226 X |
| 2,560,318 | 7/1951 | Wenger | 30/226 |
| 3,089,241 | 5/1963 | Batdorf | 30/226 |
| 3,370,353 | 2/1968 | Weissman | 30/226 X |

Primary Examiner—Jimmy C. Peters

[57] ABSTRACT

The cutter comprises a cylindrical pipe closed at one end by a plate having a plurality of eccentrically spaced holes. The pipe is externally threaded into the internally threaded pipe with a closed end having an eccentrically located hole for mounting over the protruding end of a Johnny bolt which is to be cut off. The externally threaded pipe has an upper end with holes drilled therethrough for receiving a wrench bar, wherewith to forcibly turn the externally threaded pipe within, the internally threaded pipe when the hole therein is mounted over a bolt end which extends through one of the holes in the closed end of the other pipe, so that by turning said pipes relative to each other the protruding bolt end may be broken or cut off.

2 Claims, 6 Drawing Figures

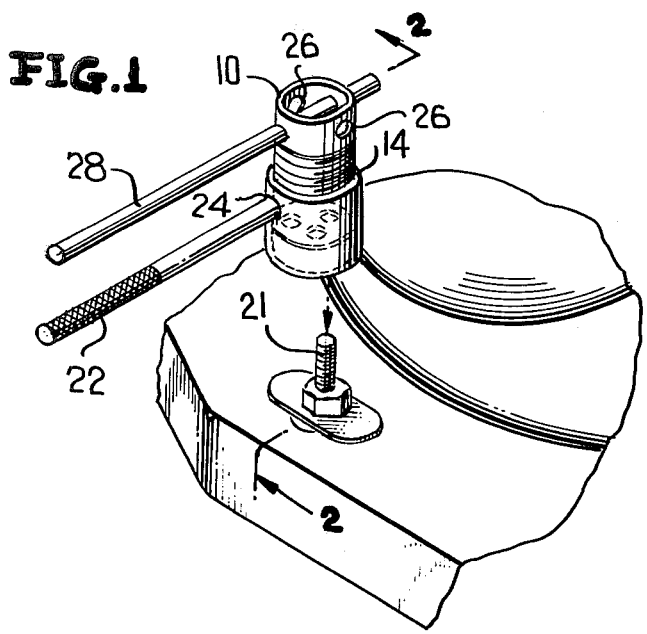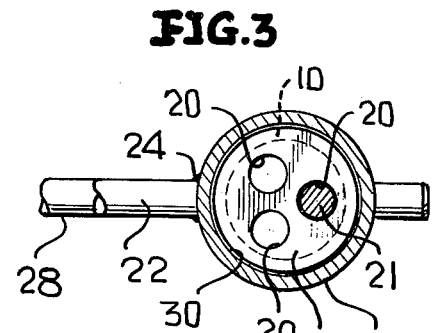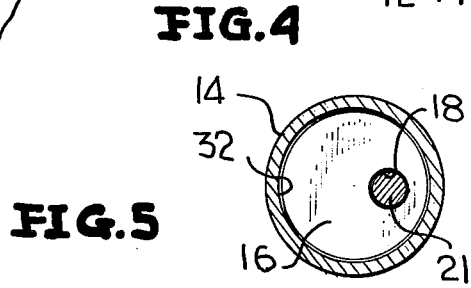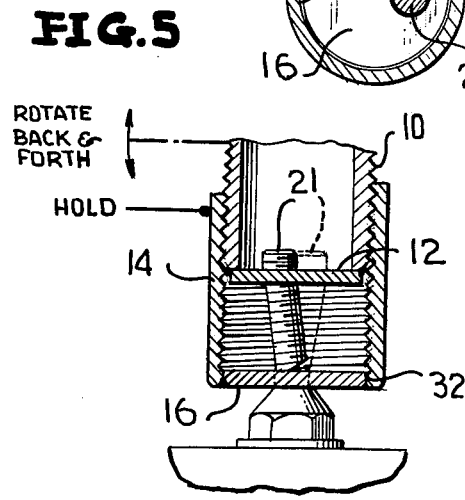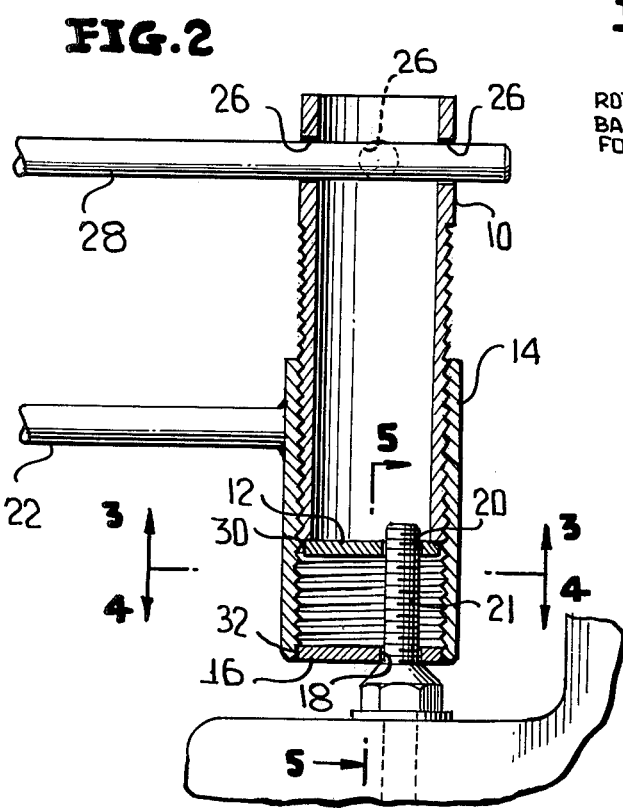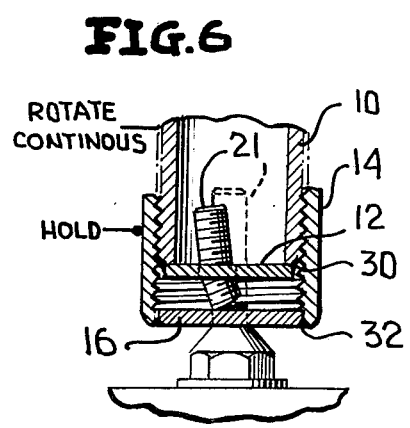

JOHNNY BOLT CUTTER

SUMMARY OF THE INVENTION

This invention relates to cutters for protruding bolt ends, such as disclosed in a prior application of the present applicant's Ser. No. 778,596 filed Mar. 17, 1977 which issued Jan. 24, 1978, U.S. Pat. No. 4,069,582.

This invention relates to improvements in cutting tools, including a bolt cutter, particularly to a bolt cutter of Johnny base hold down bolts when said bolt ends are sunken within the cupped portions of a Johnny base, so that it may be possible to cut said bolt ends at the base of their protruding ends.

The object of the invention is to provide a practical tool for cutting or breaking off the end of a protruding bolt so that a cap or other cover may be mounted over the nut tightened on said bolt.

A further object is to provide a device of this type that is practical, simple in construction, positive in operation and easy to make.

A further object is to provide a cutter tool with plates having bores for use around sunken bolt ends within the cupped portions of the Johnny base around said bolt ends.

Further objects will become apparent in the following detailed description of a preferred form of this invention, as illustrated in the accompany drawing, wherein:

FIG. 1 is a perspective view of the cutter tool to be applied to a protruding bolt end, FIG. 2 is a sectional veiw of the tool applied to a protruding bolt end, taken on the line 2—2 in FIG. 1, FIG. 3 is a sectional view of the tool taken on the line 3—3 in FIG. 2, FIG. 4 is a sectional view of the tool taken on the line 4—4 in FIG. 2, FIG. 5 is a sectional view of the tool taken on the line 5—5 in FIG. 2, and FIG. 6 is a similar sectional view with the inner pipe screwed in further into the external pipe before it is mounted on the bolt end.

DETAILED DESCRIPTION OF THE INVENTION

This cutting tool is composed of a pipe 10 having a closed end 12 at its bottom and is screwthreaded into pipe 14, which has a closed end 16 at its bottom with a bore 18 eccentrically located therein. Closed end 12 has a plurality of bores 20 eccentrically spaced around the end, and adapted to be lined up with the end 16 so that the bore 18 and one of the bores 20 are mounted over a protruding bolt 21 which is to broken or cut off.

When installing a Johnny base, the hold down bolts usually protrude considerably from the nut after it is tightened firmly, and have to be cut off to allow a covercap to be installed over the nut end of the bolt. It is normally difficult to get the jaws of an ordinary bolt cutter down over the base of the protruding portion of the bolt close to the top of the nut, especially if the bolt extends from a cupped portion in the Johnny base. The bottom end of the outer pipe of the present cutter will readily fit into the hollow of such cupped portion, so that the bore 18 will rest right over the nut at the base of the protruding portion of the bolt where it is easily broken by turning the pipes relatively to each other.

An arm 22 may be fixed to the pipe 14 as by welding at 24, and the pipe 10 may be transversely bored as at 26, to receive turning bar 28, whereby the two pipe portions 10 and 14 may be forcibly turned relatively to each other to break or cut a protruding bolt portion over which the tool may be mounted.

The bottom ends of the pipes may be closed by plates welded as at 30 and 32 to the pipes 10 and 14 respectively.

Many obvious modifications in form and detail structure of this disclosure may be made without departing from the spirit and scope of the present invention.

What is claimed is:

1. A cutting tool comprising an internally threaded pipe having its bottom end closed by a plate with an eccentrically located hole,
   an externally threaded pipe having a closed bottom end formed by a plate with at least one eccentrically located hole,
   said externally threaded pipe being threaded into said internally threaded pipe, and
   handle means for forcibly turning said pipes relatively to each other when mounted over a bolt end passing through said holes to break or cut said bolt at the hole in said outer plate.

2. A cutting tool as defined in claim 1,
   said means for turning said pipes comprising a handle extending radially from the outside of said internally threaded pipe,
   the upper end of said externally threaded pipe being transversely bored, and a wrench bar received in said bores to form a handle for turning said externally threaded pipe.

* * * * *